R. P. FOX.
SAFETY ATTACHMENT FOR AIRPLANES.
APPLICATION FILED SEPT. 5, 1919.
1,348,704.
Patented Aug. 3, 1920.
6 SHEETS—SHEET 5.
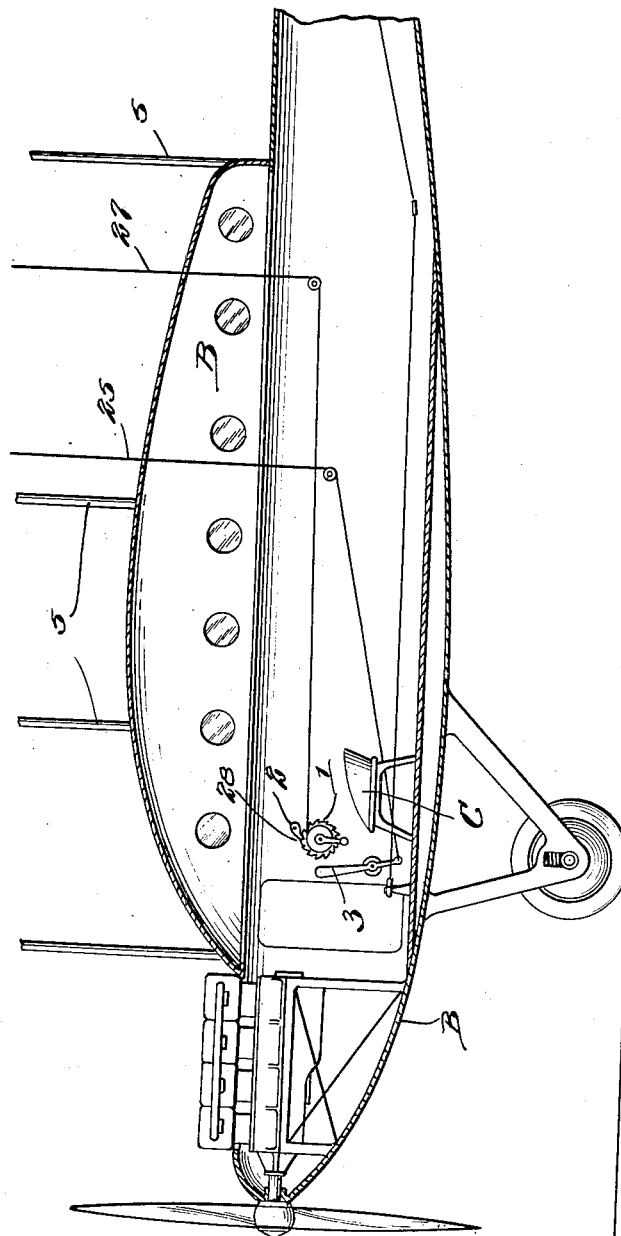
WITNESS:
Fred L. Fox.
INVENTOR.
R. P. Fox.
BY
Victor J. Evans.
ATTORNEY.

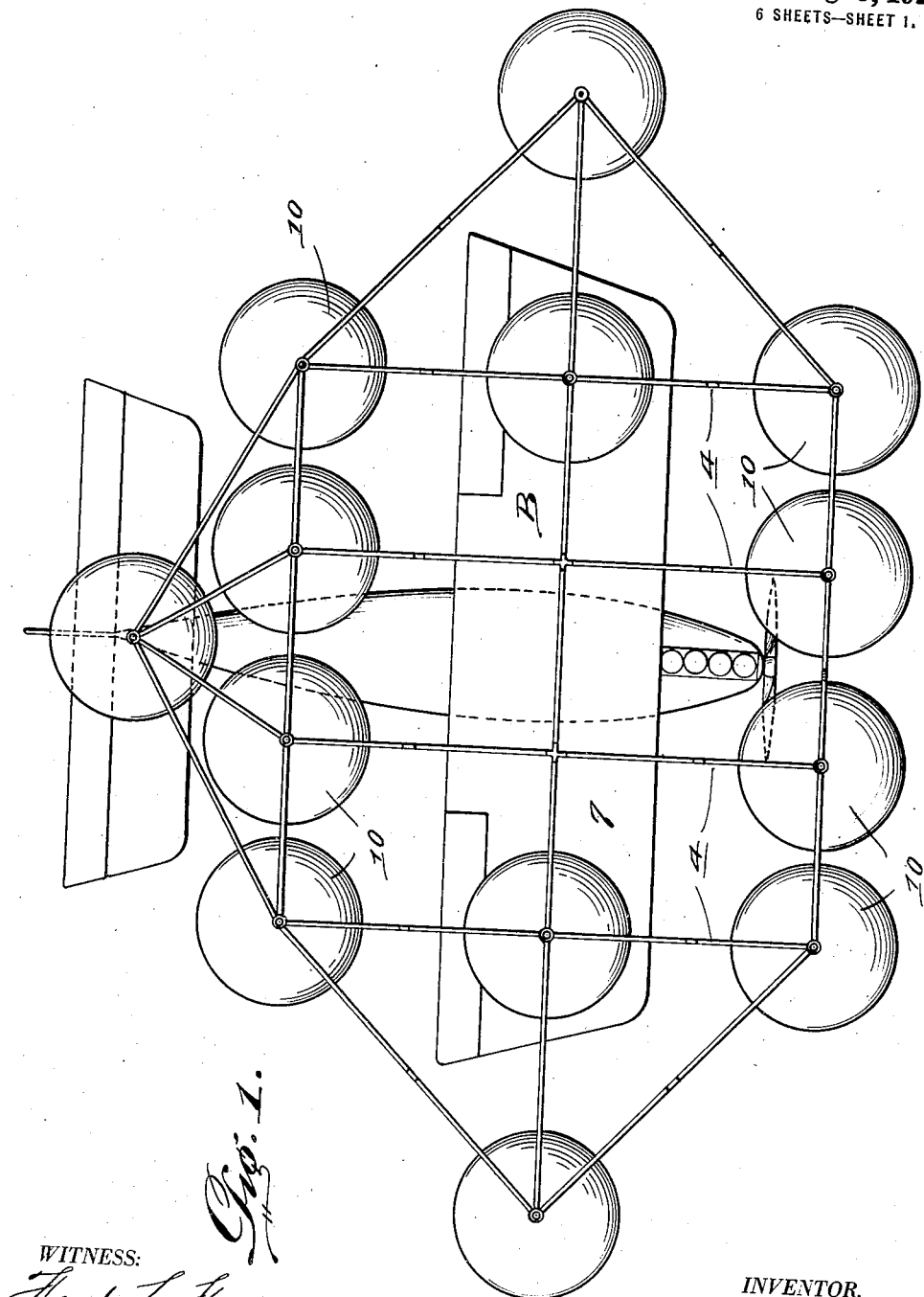

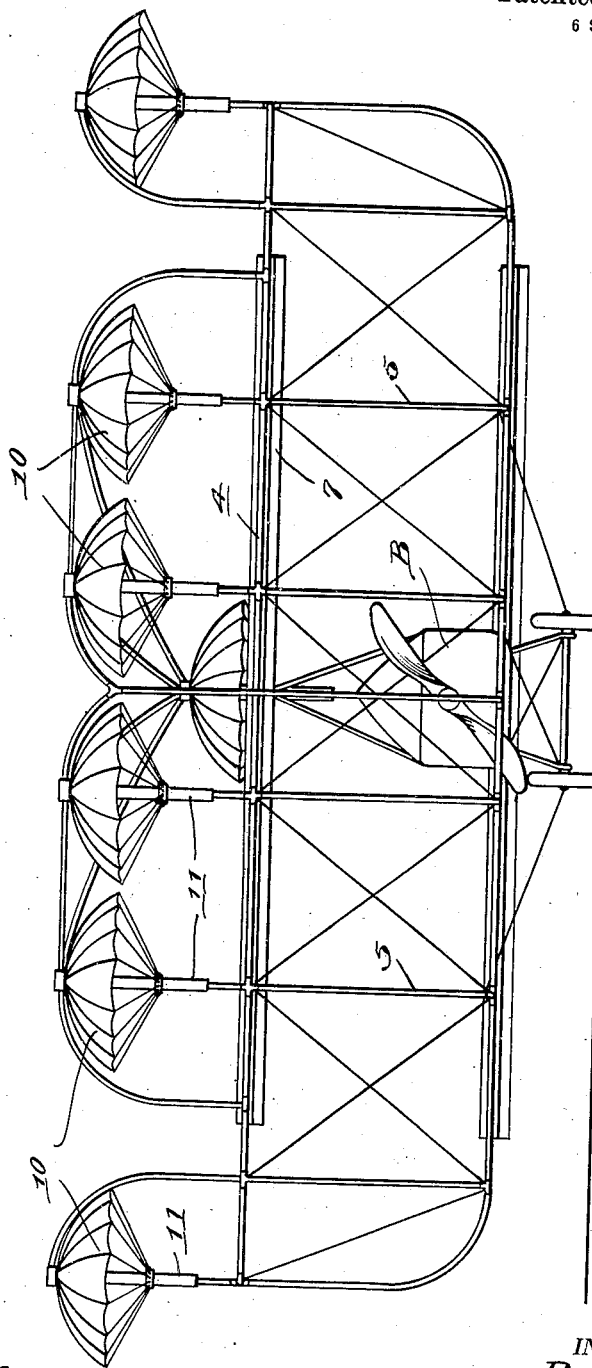

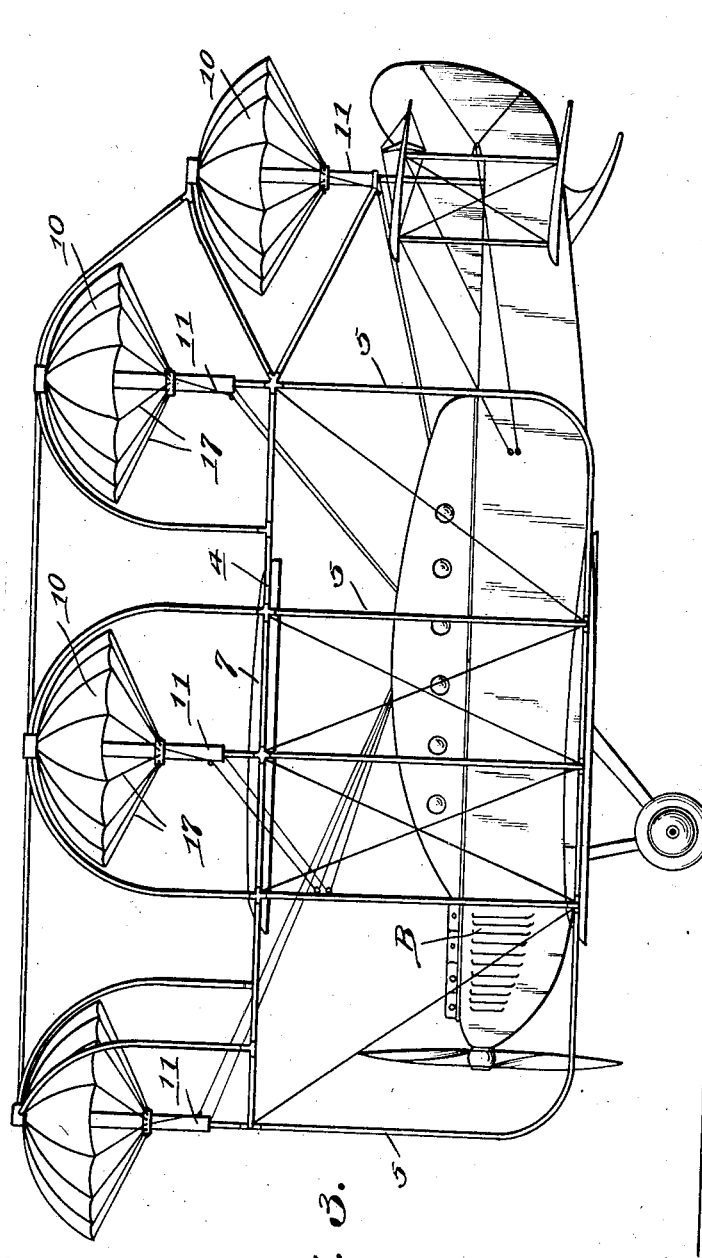

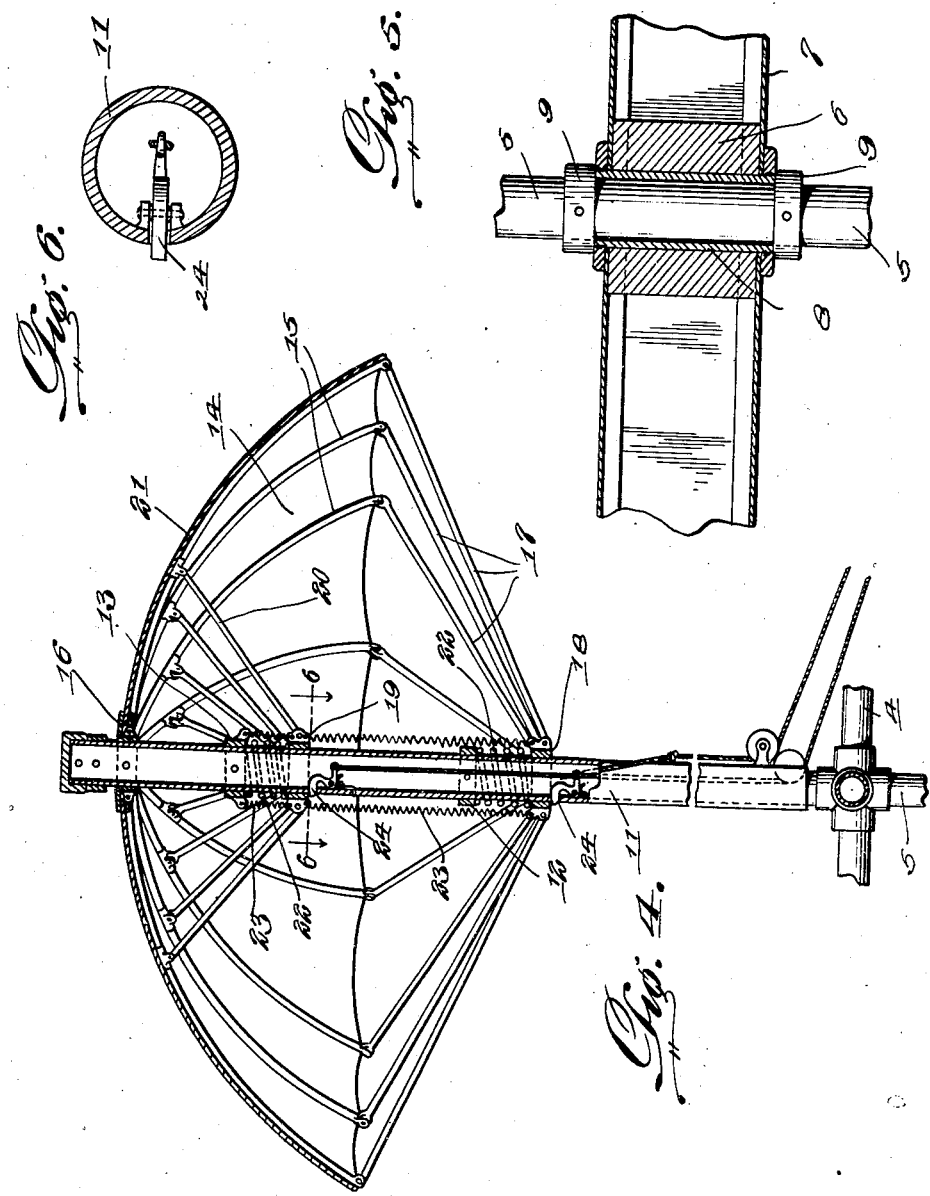

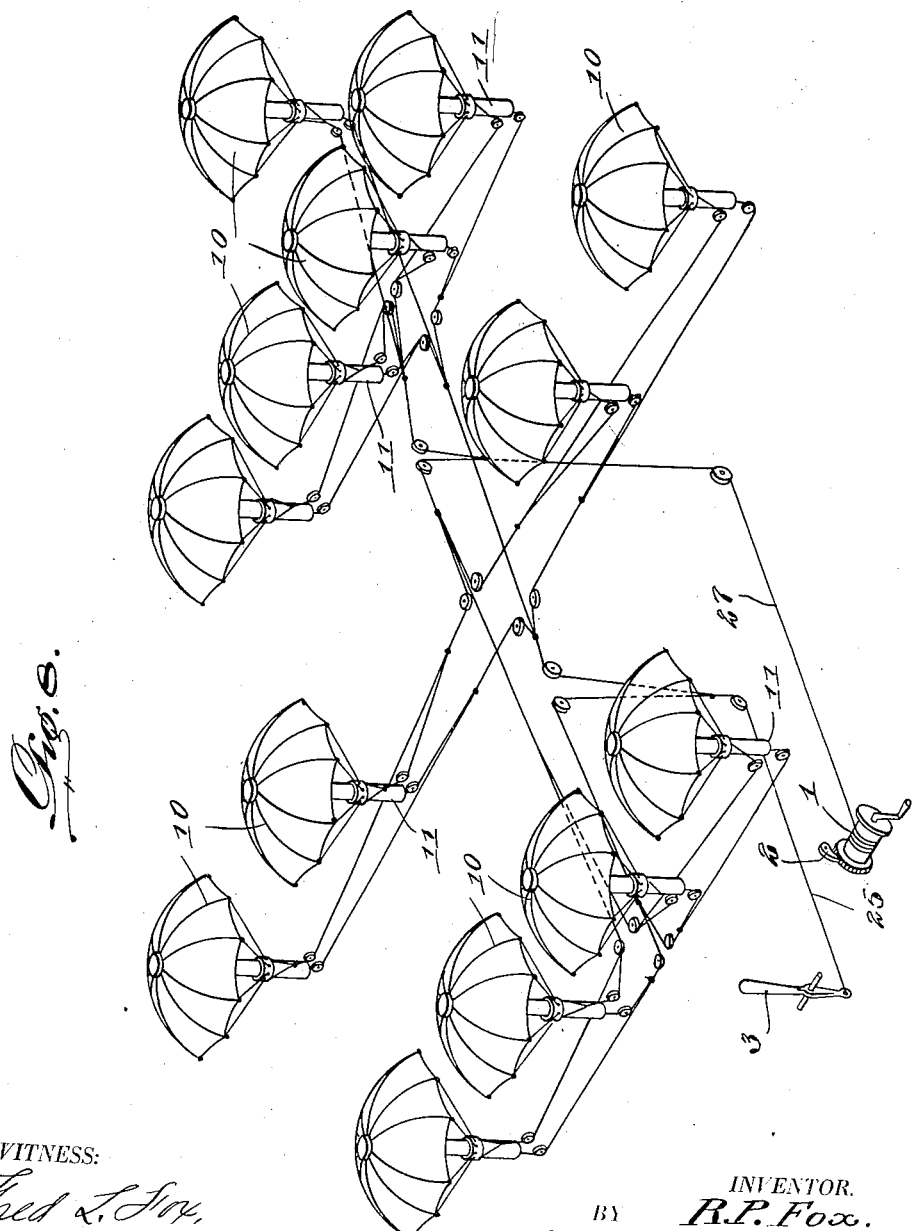

UNITED STATES PATENT OFFICE.

RALPH P. FOX, OF HARRISBURG, PENNSYLVANIA.

SAFETY ATTACHMENT FOR AIRPLANES.

1,348,704.  Specification of Letters Patent.  Patented Aug. 3, 1920.

Application filed September 5, 1919. Serial No. 321,746.

*To all whom it may concern:*

Be it known that I, RALPH P. FOX, a citizen of the United States, residing at Harrisburg, in the county of Dauphin and State of Pennsylvania, have invented new and useful Improvements in Safety Attachments for Airplanes, of which the following is a specification.

This invention relates to an attachment for airplanes by means of which an airplane may have its descent retarded to a safe speed, and has for its primary object to accomplish this result with a simple type of mechanism in which the parts are so arranged and associated that they may be instantly moved to an operative position upon the operation of a single lever arranged within reach of the aviator.

An object of the invention is the provision of a plurality of parachutes so arranged that the airplane will be accurately balanced and the speed thereof, in its descent, reduced to a safe degree in case of accident.

Besides the above my invention is distinguished in the provision of a parachute of substantial construction in which the parts are so arranged that with very little friction and strain upon the parts the parachute will instantly move to an operative position at the will of the aviator.

With these and other objects in view the invention will be better understood from the following detailed description taken in connection with the accompanying drawings, wherein:

Figure 1 is a top plan view of the attachment.

Fig. 2 is a front elevation.

Fig. 3 is a side elevation.

Fig. 4 is an enlarged section view of one of the parachutes.

Fig. 5 is a detailed section view through a part of the wing of an airplane showing how the frame is supported thereby.

Fig. 6 is a section view of one of the tubes of the frame.

Fig. 7 is a longitudinal section view through the body of the airplane.

Fig. 8 is a diagrammatic view illustrating the connection between the lever, drum, and the various parachutes.

Again referring to the drawings illustrating one manner in which my invention may be constructed the letter B designates an airplane of any well-known construction. Arranged adjacent the seat C of the airplane is a drum 1 controlled in its movement by the ratchet 2. A pivoted lever 3 is also arranged within reach of the aviator when in seat C. The operation of the drum 1 and lever 3 controls the operation of my safety attachment now to be described. A frame 4 consisting of a plurality of tubes connected together is supported above the airplane by certain tubes 5 that pass through the solid ribs 6 of the wing 7 of the airplane. To reinforce this connection I provide a sleeve 8 engaging the tube between the fixed collars 9 on the latter. Supported by the frame is a plurality of parachutes 10 which may be of any number, and distributed with relation to the airplane to properly balance the latter when the descent of the airplane is controlled by the parachutes.

As clearly shown in Fig. 4 each parachute consists of a tube 11 projecting from the frame having fixed thereon collars 12 and 13. The body 14 of the parachute, which in one of its forms as illustrated in the drawing, is of an umbrella construction having ribs 15 pivoted to the plates 16 that are secured to the tube and further pivotally connected to the lower set of stays 17 that in turn are pivotally connected to a lower ring 18. An upper ring 19 has a pivotal connection with an upper set of stays 20 that are pivotally connected to the ribs 15. From this construction it will be seen that in the upward sliding movement of the rings the stays will force the ribs to an uncollapsed position so that the fabric covering 21 for the ribs 15 will be unfolded so as to have the proper effect upon the atmosphere. Arranged between the fixed collars and the slidable rings are bumper springs 22 so as to absorb the shock when the body moves into its uncollapsed position. Coöperating with the air pressure to force the parachute to an unfolded condition I provide contractile springs 23 connected respectively to the collars and rings. Suitably arranged spring pressed catches 24 engage under the rings for preventing return of the parachute to a collapsed position. The catches of all the parachutes are connected to a single release cable 25 that is in turn connected to the pivoted lever 3, which may be foot or hand operated. Thus it will be seen that when operating the lever the catches of all the parachutes may be simultaneously operated for allowing the parachutes to be collapsed in a manner now to be described. All the lower rings of the parachutes are connected to a controlling cable 27 wrapped around the drum 1. As the drum is ratchet controlled it will be seen that when the parachutes are forced to a collapsed condition they will be mechanically held in this position during the regular travel of the airplane, but, upon displacement of the pawl 28 of the ratchet the cable 27 is free to unwind, thereby allowing the parachutes to unfold.

It is of course to be understood that the invention may be constructed in various other manners and the parts associated in other relations, and besides the mechanical changes may be made to meet with the requirements when putting the invention into practical use, and therefore I do not desire to be limited in any manner except as set forth in the claims hereunto appended.

What I claim is:

1. An attachment for airplanes comprising a plurality of collapsible parachutes, spring means for normally holding the parachutes in open position, latching means for each parachute, for preventing the same from closing, a lever, flexible means for connecting the lever with the latch means of all the parachutes to release the same, a drum, flexible means connecting the drum with the parachutes for simultaneously collapsing the parachutes when the drum is rotated, a handle on the drum and ratchet mechanism for the drum.

2. An attachment for airplanes comprising a frame, a plurality of collapsible parachutes carried by the frame, each parachute having a pair of rings, stays connecting the rings with the ribs of the parachute, spring means engaging the rings and tending to hold the parachute in open position, a latch for engaging each ring for locking the parachute in open position, a hand lever, flexible means for connecting the same with each of the latches, a hand operated drum, flexible means connecting the same with all the parachutes for collapsing the parachutes when the drum is turned and ratchet mechanism for the drum.

3. A parachute comprising: a tube, fixed collars on the tube, rings slidably mounted on the tube, bumpers arranged between the collars and rings, springs connecting the rings to the collars in a manner to force the rings into engagement with the bumper, springs, a collapsible body having a pivotal connection with the rings so as to be forced to an uncollapsed condition by the action of the springs, and a manually operated cable for forcing the rings in a direction against the action of the second mentioned springs for collapsing said body.

In testimony whereof I affix my signature.

RALPH P. FOX